US006896180B2

(12) United States Patent
Miodunski et al.

(10) Patent No.: US 6,896,180 B2
(45) Date of Patent: May 24, 2005

(54) SYSTEM AND METHOD FOR SECURELY STORING AND CONTROLLING THE DISPENSING OF A PAYOUT

(75) Inventors: Robert L. Miodunski, Henderson, NV (US); Robert J. Craig, Las Vegas, NV (US)

(73) Assignee: Alliance Gaming Corporation, Las Vegas, NV (US)

(*) Notice: Subject to any disclaimer, the term of this patent is extended or adjusted under 35 U.S.C. 154(b) by 94 days.

(21) Appl. No.: 10/697,453

(22) Filed: Oct. 30, 2003

(65) Prior Publication Data

US 2004/0084523 A1 May 6, 2004

Related U.S. Application Data

(63) Continuation of application No. 09/551,680, filed on Apr. 21, 2000, now Pat. No. 6,763,998, which is a continuation of application No. 09/540,237, filed on Apr. 4, 2000, now Pat. No. 6,763,998.

(60) Provisional application No. 60/130,915, filed on Apr. 23, 1999.

(51) Int. Cl.$^{7}$ .......................... G06F 17/60; G06K 5/00; A63F 9/24

(52) U.S. Cl. .......................... 235/379; 235/380; 463/16

(58) Field of Search ................................ 235/379, 380, 235/375; 463/16, 17, 18, 20, 25, 26

(56) References Cited

U.S. PATENT DOCUMENTS

| | | | |
|---|---|---|---|
| 4,113,140 | A | 9/1978 | Graef et al. |
| 4,179,031 | A | 12/1979 | Ward |
| 4,190,066 | A | 2/1980 | Burnside |
| 4,283,709 | A | 8/1981 | Lucero et al. |
| 4,365,700 | A | 12/1982 | Arimoto et al. |
| 4,503,963 | A | 3/1985 | Steiner |
| 4,570,801 | A | 2/1986 | Brannen |
| 4,636,951 | A | 1/1987 | Harlick |
| 4,669,730 | A | 6/1987 | Small |
| 4,803,347 | A | 2/1989 | Sugahara et al. |
| 4,815,741 | A | 3/1989 | Small |
| 4,871,088 | A | 10/1989 | Cox |
| 4,880,237 | A | 11/1989 | Kishishita |
| 4,964,638 | A | 10/1990 | Ishida |
| 4,980,543 | A | 12/1990 | Hara et al. |
| 5,000,322 | A | 3/1991 | Goi |
| 5,016,546 | A | 5/1991 | Haueter |

(Continued)

FOREIGN PATENT DOCUMENTS

| | | |
|---|---|---|
| DE | 42 40 787 A1 | 6/1994 |
| EP | 0 320 792 A2 | 12/1988 |
| WO | WO 85/00910 | 2/1985 |
| WO | WO 99/22350 | 5/1999 |

*Primary Examiner*—Karl D. Frech
*Assistant Examiner*—April Taylor
(74) *Attorney, Agent, or Firm*—Brown Raysman Millstein Felder & Steiner LLP

(57) ABSTRACT

In a system and method for securely storing and controlling the dispensing of a payout, the system includes a payout dispenser for securely storing and dispensing a payout, and a terminal for controlling the dispensing of the payout and for interfacing with an attendant in connection with the payout. The system further includes a network for interconnecting the payout dispenser and the terminal. The system may also include a device for indicating a payout payable responsive to the input of a person to whom the payout is payable, wherein the payout indicating device may be connected to the payout dispenser and the terminal by a network. The system may further include a device for enabling the dispensing of a payout breakage amount which is the difference between the payout in a payout dispenser denomination and the payment to be paid out. The system may still further include a central terminal for centrally controlling the dispensing of payouts at a plurality of local stations to which the central terminal may be networked.

105 Claims, 7 Drawing Sheets

U.S. PATENT DOCUMENTS

| | | | | | |
|---|---|---|---|---|---|
| 5,051,900 | A | | 9/1991 | Ito et al. | |
| 5,071,031 | A | | 12/1991 | Yuge et al. | |
| 5,091,713 | A | | 2/1992 | Horne et al. | |
| 5,116,055 | A | | 5/1992 | Tracy | |
| 5,179,517 | A | | 1/1993 | Sarbin et al. | |
| 5,238,143 | A | | 8/1993 | Crighton | |
| 5,265,874 | A | | 11/1993 | Dickinson et al. | |
| 5,276,312 | A | | 1/1994 | Mccarthy | |
| 5,393,061 | A | | 2/1995 | Manship et al. | |
| 5,397,125 | A | | 3/1995 | Adams | |
| 5,435,542 | A | | 7/1995 | Van Pham et al. | |
| 5,494,287 | A | | 2/1996 | Manz | |
| 5,511,784 | A | | 4/1996 | Furry et al. | |
| 5,515,959 | A | | 5/1996 | Stephenson, III et al. | |
| 5,533,605 | A | | 7/1996 | Mays et al. | |
| 5,544,728 | A | | 8/1996 | Dabrowski | |
| 5,559,312 | A | | 9/1996 | Lucero | |
| 5,570,885 | A | | 11/1996 | Ornstein | |
| 5,580,310 | A | | 12/1996 | Orus et al. | |
| 5,586,936 | A | | 12/1996 | Bennett et al. | |
| 5,611,730 | A | | 3/1997 | Weiss | |
| 5,615,625 | A | | 4/1997 | Cassidy et al. | |
| 5,662,202 | A | | 9/1997 | Suris | |
| 5,715,923 | A | | 2/1998 | Dekker et al. | |
| 5,715,924 | A | | 2/1998 | Takemoto et al. | |
| 5,725,081 | A | | 3/1998 | Meeker | |
| 5,740,897 | A | | 4/1998 | Gauselmann | |
| 5,743,799 | A | | 4/1998 | Houriet, Jr. et al. | |
| 5,803,227 | A | | 9/1998 | Stein et al. | |
| 5,813,914 | A | | 9/1998 | McKay et al. | |
| 5,816,918 | A | | 10/1998 | Kelly et al. | |
| 5,836,510 | A | | 11/1998 | Kirchner | |
| 5,839,956 | A | | 11/1998 | Takemoto | |
| 5,871,398 | A | | 2/1999 | Schneier et al. | |
| 5,902,983 | A | | 5/1999 | Crevelt et al. | |
| 5,907,141 | A | | 5/1999 | Deaville et al. | |
| 5,918,720 | A | | 7/1999 | Robinson et al. | |
| 6,001,016 | A | * | 12/1999 | Walker et al. | 463/42 |
| 6,014,594 | A | | 1/2000 | Heidel et al. | |
| 6,024,640 | A | | 2/2000 | Walker et al. | |
| 6,048,269 | A | | 4/2000 | Burns et al. | |
| 6,055,521 | A | | 4/2000 | Ramsey et al. | |
| 6,065,672 | A | | 5/2000 | Haycock | |
| 6,068,101 | A | | 5/2000 | Dickenson et al. | |
| 6,073,837 | A | | 6/2000 | Milne | |
| 6,113,492 | A | * | 9/2000 | Walker et al. | 463/16 |
| 6,128,550 | A | | 10/2000 | Heidel et al. | |
| 6,168,521 | B1 | * | 1/2001 | Luciano et al. | 463/18 |
| 6,289,261 | B1 | * | 9/2001 | Heidel et al. | 700/231 |
| 6,340,331 | B1 | * | 1/2002 | Saunders et al. | 463/25 |

* cited by examiner

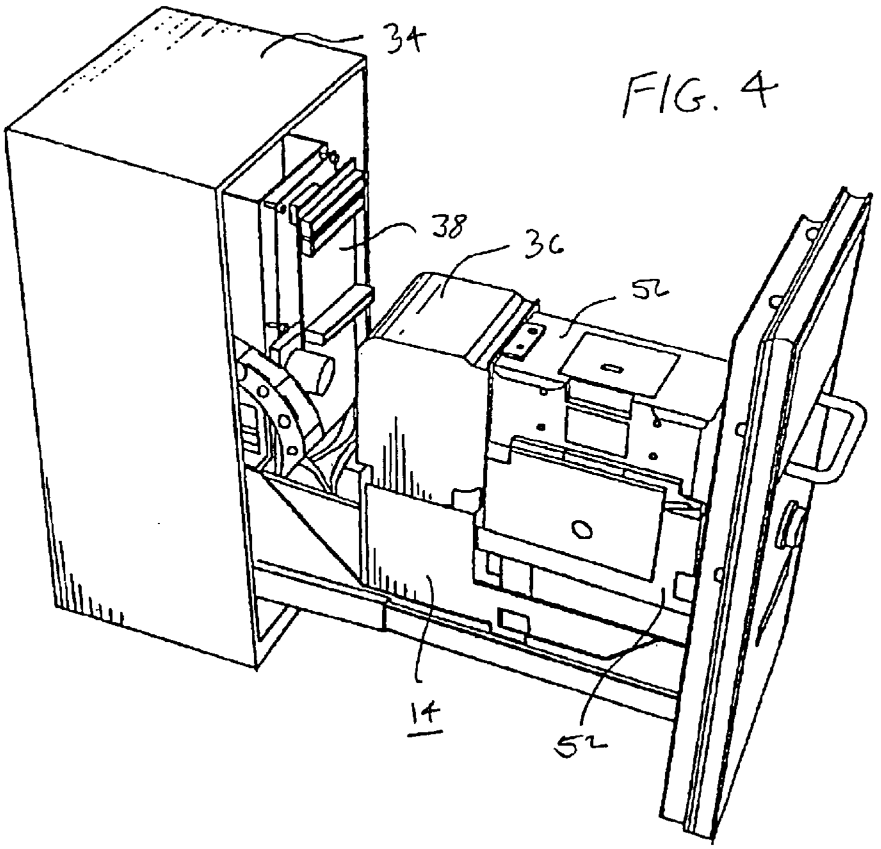
FIG. 4
FIG. 5
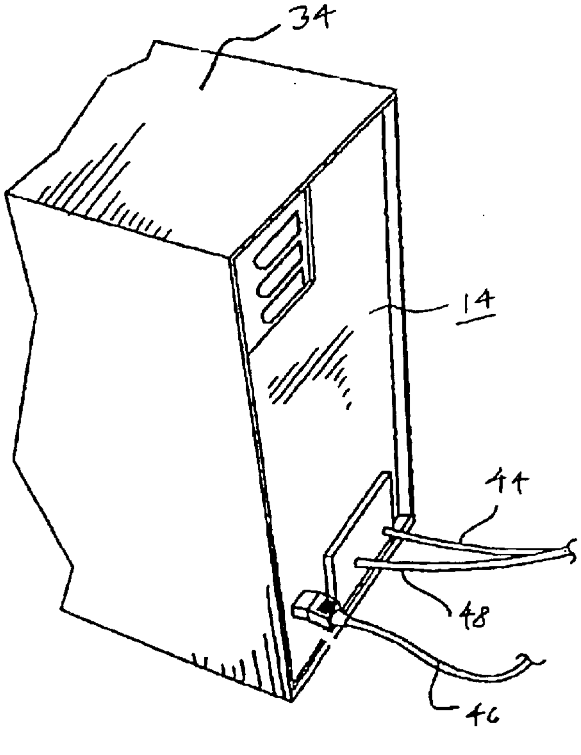

SYSTEM AND METHOD FOR SECURELY STORING AND CONTROLLING THE DISPENSING OF A PAYOUT

RELATED APPLICATIONS

This application is claiming the benefit of a co-pending provisional application Ser. No. 60/130,915 filed on Apr. 23, 1999, and is a continuation of application Ser. No. 09/551,680, filed April 21, 2000 now U.S. Pat. No. 6,763,998, which is a continuation of utility application Ser. No. 09/540,237 filed on Apr. 4, 2000 now U.S. Pat No. 6,763,998.

BACKGROUND OF THE INVENTION

This invention relates generally to improvements in payout storage and control systems and methods and, more particularly, to a new and improved system and method for securely storing and controlling the dispensing of a payout.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

DESCRIPTION OF THE RELATED ART

It has been known to provide systems such as retail registers and change machines for storing and enabling the dispensing of payouts at locations such as retail stores or the like. A large supply of money had to be kept on hand at such locations, to cover substantial transactions, requiring inefficient and inconvenient refilling of such supply on a relatively frequent basis. Further, such large supplies of money were maintained in relatively insecure retail registers and/or change machines at such locations, where such machines were subject to theft of the money by criminals and/or attendants.

It has been further known in jurisdictions where gambling is legal, such as Nevada, to have gaming machines at locations such as convenience stores, grocery stores, taverns, or the like, as for example video poker machines and/or electronic slot machines. The gaming machines may include coin hoppers for receiving coins for game play and for storing coins for payment of payouts such as cash outs and/or jackpots resulting from the play of the game. The coin hoppers in such machines had to be refilled relatively frequently due to substantial payouts. Further, large amounts of money had to be kept on hand at such remote locations, to cover substantial payouts incurred at such machines beyond the amount of coins in the coin hoppers. Also, such large amounts of money were maintained in relatively insecure retail registers and/or change machines at such locations, where such machines were also subject to theft of the money by criminals and/or attendants.

In addition to such refilling and security issues, in a route type environment, wherein the route may comprise locations remote from each other for refilling retail registers, change machines, and/or gaming machine coin hoppers, the frequency of refilling has greatly increased and has become very much of an inconvenience. In such route type environment, particularly for gaming machine locations, the inconvenience of frequent refilling has escalated with the popularity of bill acceptors in gaming machines, where the coin hoppers are not replenished with coins played into the machine, whereby payouts cannot be made from the coin hopper without emptying it.

Therefore, those concerned with the development and use of improved payout storage and control systems and methods and the like have recognized the need for improved systems and methods for enabling a substantial supply of payouts to be securely stored and for controlling the dispensing of the payouts, so as to reduce the need for frequent refilling thereof.

Accordingly, the present invention fulfills these needs by providing efficient and effective systems and methods for securely storing and controlling the dispensing of a payout, so as to enable a substantial supply of payouts to be securely stored, to reduce the need for refilling of the payout supply, and to control the dispensing of a payout.

SUMMARY OF THE INVENTION

Briefly, and in general terms, the present invention provides a new and improved system and method for securely storing and controlling the dispensing of a payout.

By way of example, and not by way of limitation, the present invention provides a new and improved system for enabling the secure storing and controlled dispensing of a payout, so as to increase security and reduce the need for refilling thereof.

More particularly, the present invention may include a system for securely storing and controlling the dispensing of a payout at a local station. The system may include a payout dispenser, for securely storing and dispensing a payout. It may further include a terminal, for controlling the dispensing of the payout, adapted to be connected to the payout dispenser and to interface with an attendant in connection with the payout. The system may also include a network for interconnecting the payout dispenser and the terminal.

The payout dispenser may be adapted to store and dispense a payout in a payout dispenser denomination, and the system may further include a device for indicating a payout payable responsive to the input of a person to whom the payout is payable, such as for a cashout or jackpot resulting from the play of a game in a gaming machine. The payout indicating device may be connected to the payout dispenser and the terminal by a network. The system may further include a device for enabling the dispensing of a payout breakage amount, which is the difference between the payout in the payout dispenser denomination and the payment to be paid out, in a payout breakage denomination smaller than the payout dispenser denomination.

In such a system adapted to include a central station and a plurality of local stations, the central station may include a central terminal for centrally controlling the dispensing of the payouts at the local stations. The plurality of local stations may each be adapted to be connected to the central station, and may each include a payout dispenser, and a local terminal. The system may further include a network for interconnecting the central station and the local station, adapted to interconnect the local station payout dispenser, the local terminal, and the central terminal.

Therefore an advantage of the present invention is that it includes a system for enabling the secure storing and controlled dispensing of a payout. A plurality of payout indicating devices such as gaming machines may be connected at a remote location to a local terminal and/or a central terminal, to enable payments to be efficiently and securely made for winnings and/or cash outs posted on the gaming machines. A payout dispenser enables a payout attendant on site to efficiently make the appropriate payout from the supply of the payout denomination securely stored in and automatically dispensed from the payout dispenser, under the control of the local or central terminal for verification of the transaction. In a local-central networked system, the on-site local terminal is adapted to be controlled by the central terminal at the central station for verification of transactions. The system is adapted to efficiently make payment determinations based on the amount of the transaction, to effectively verify the transaction amount, and to efficiently decide whether a payout may be dispensed from the payout dispenser and/or whether the payment may be effected from the payout breakage device which may be funded by the payout dispenser.

Another advantage is that the present invention provides a system adapted to be securely and conveniently installed in locations such as convenience stores, grocery stores, or taverns, where it may not have been available previously because of the security risk in the large amounts of payouts that were necessary to be kept on hand, and because it would not be desirable to have large amounts in non-secure containers.

A further advantage is that the present invention enables the convenient and efficient supplying of sufficient payouts for secure storing and automatic verified dispensing thereof, in a route type system with spread out locations where dispenser are located remotely from each other.

A still further advantage is that the system enables the automatic payout from the secure supply in the payout dispenser, in locations where the payout indicating devices comprise gaming machines which may include bill acceptors and coin hoppers, while substantially eliminating the need for frequent inconvenient and inefficient refilling of the coin hoppers, and enables payouts to be made from a central fund to circumvent the rapidly dissipated supply of coins in coin hoppers in gaming machines.

Another advantage is that the payout dispenser comprises a secure safe-like container, rather than a cash drawer which may be readily pried open or easily accessed by a criminal, providing secure storage of the payout supply. Further, on-site attendant need not be provided with a key to the payout dispenser, whereby the attendant may not be able to obtain access to the payout supply if a criminal or the attendant desires to obtain such access.

These and other objects and advantages of the invention will become apparent from the following more detailed description, when taken in conjunction with the accompanying drawings of illustrative embodiments.

BRIEF DESCRIPTION OF THE DRAWINGS

FIG. 4 is a side perspective view of a payout dispenser opened up to show the internal elements, in accordance with an embodiment of the invention;

FIG. 5 is a rear perspective view of a payout dispenser showing connections thereto, in the practice of an embodiment of the present invention;

DETAILED DESCRIPTION OF THE PREFERRED EMBODIMENTS

Figure 1:
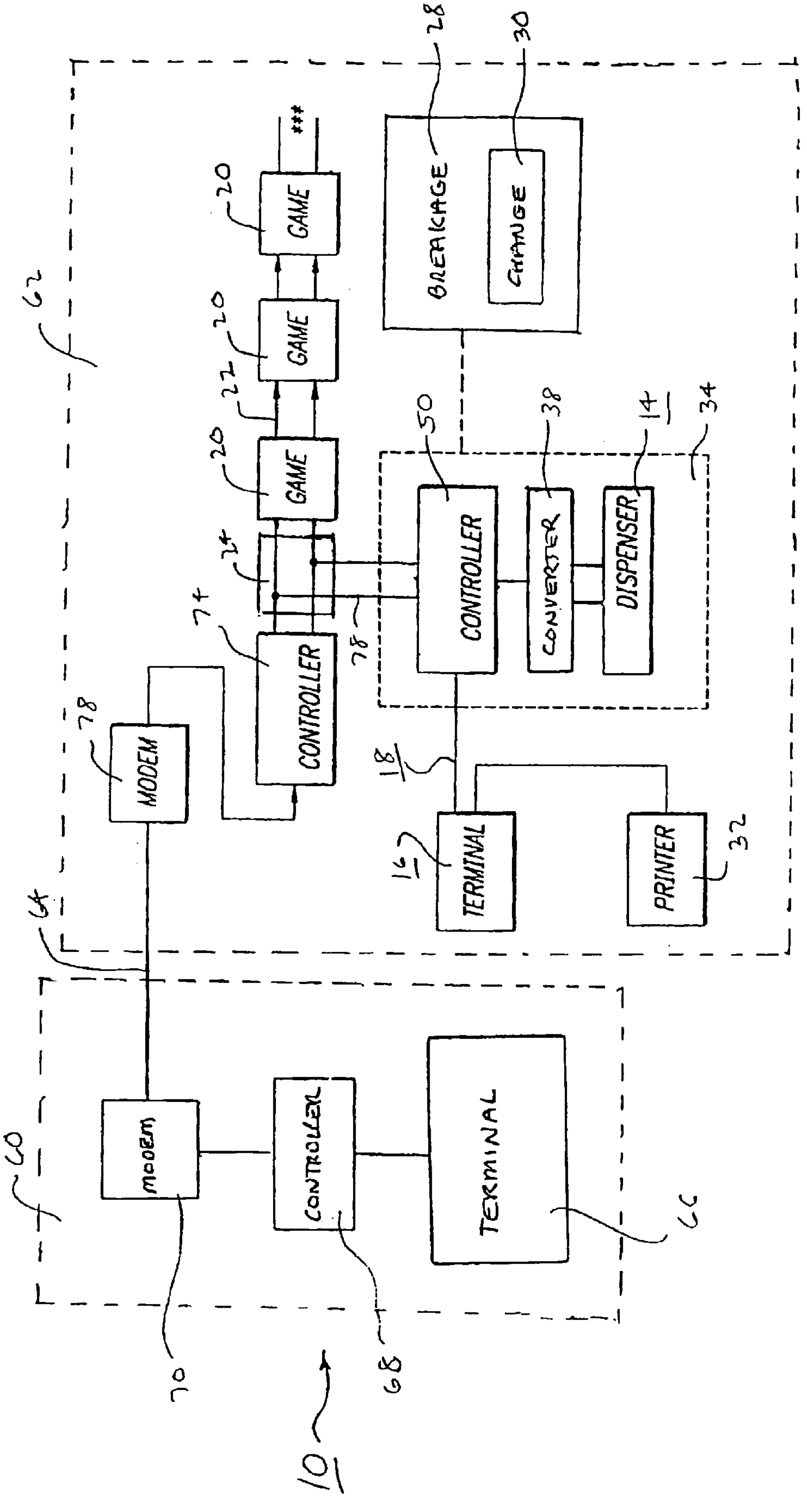
FIG. 1 is a block diagram of a local station-central station networked system, in accordance with an embodiment of the present invention.

The present invention is directed to an improved system and method for securely storing and controlling the dispensing of a payout. The improved system and method provides efficient storing of payouts and effective control of the dispensing thereof. The preferred embodiments of the improved system and method are illustrated and described herein by way of example only and not by way of limitation.

Referring now to the drawings, wherein like reference numerals denote like or corresponding parts throughout the drawing figures, and particularly to FIGS. 1–10, a system 10 is provided for securely storing a payout 12, and for controlling the dispensing of the payout 12. The payout 12 may comprise for example paper money currency, paper scrip, a coupon, or any other desired item to be dispensed. The payout 12, for example, may constitute payment of all or part of an amount to be paid out, and/or may enable payment of all or part of an amount to be paid out.

Figure 2:
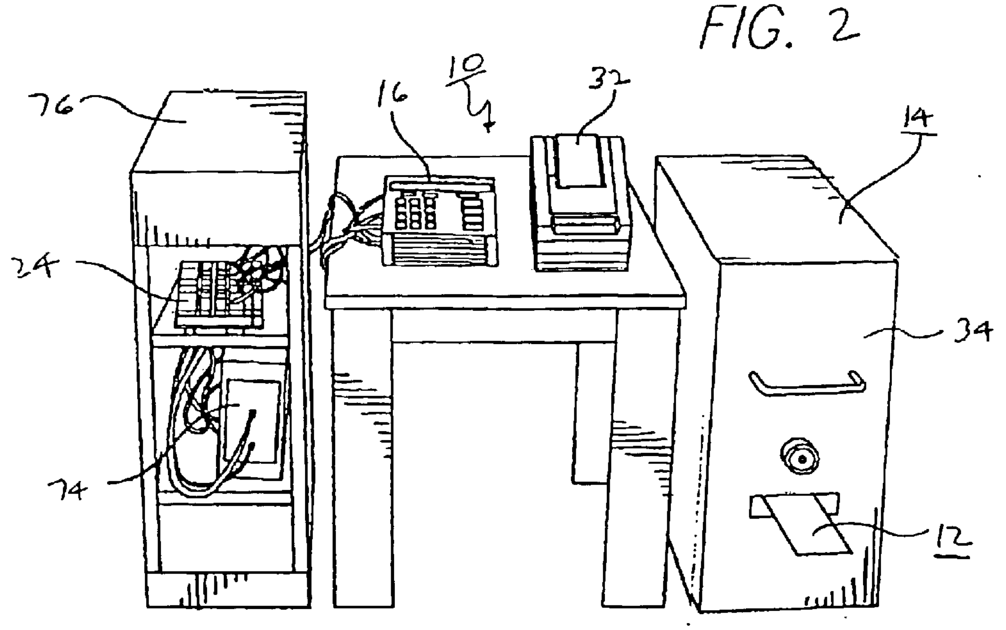
FIG. 2 is a perspective view of a payout dispenser, a terminal, a controller, and a printer, in an embodiment of the invention.
Figure 3:
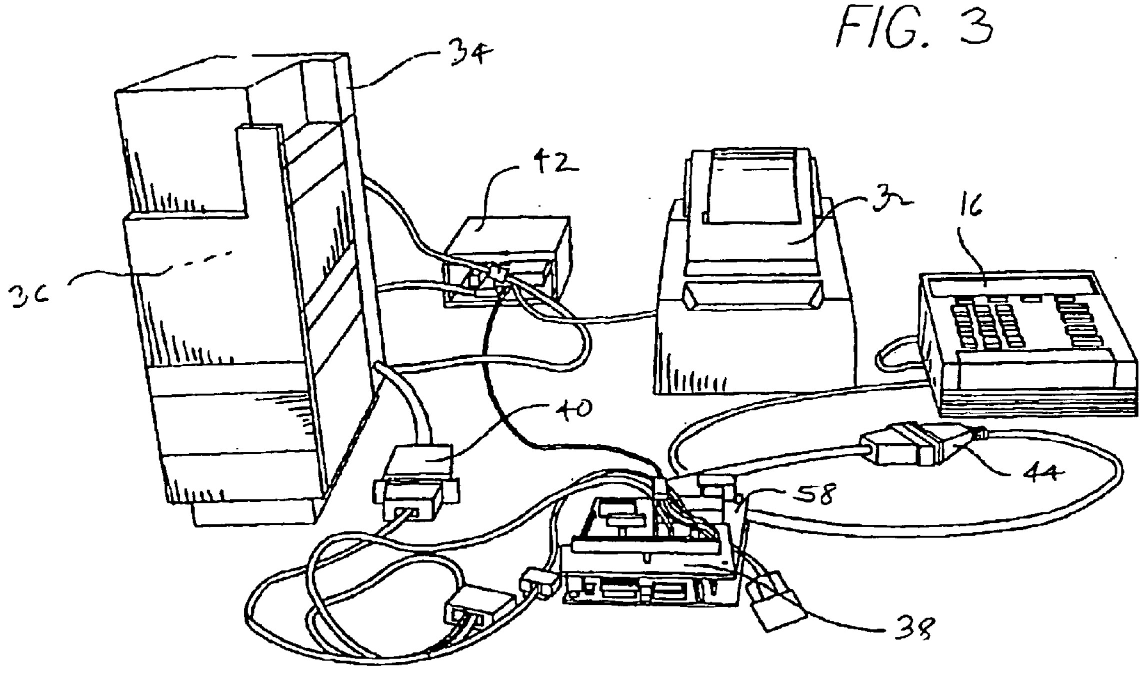
FIG. 3 is a perspective view of a payout dispenser with internal elements taken out, a terminal, and a printer, in the practice of an embodiment of the invention.
Figure 6:
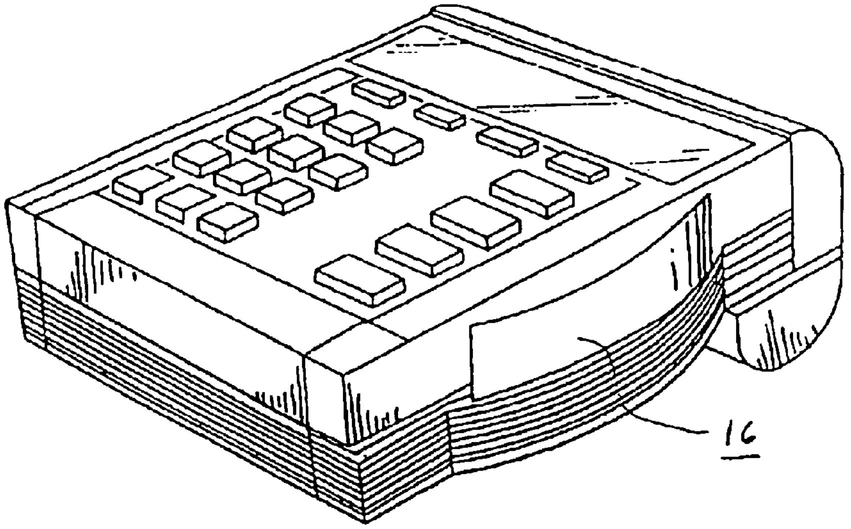
FIG. 6 is a perspective view of a terminal pursuant to an embodiment in the practice of the invention.

As shown in FIGS. 1–3, in a system 10 adapted to be located at a single location, such as for example in a convenience store or the like, the system 10 includes a payout dispenser 14, for securely storing and dispensing units of the payout 12, a terminal 16, adapted to be connected to the payout dispenser 14, for controlling the dispensing of the payout 12 and for interfacing with an attendant in connection with the payout 12, and a payout dispenser-terminal network 18, for interconnecting the payout dispenser 14 and the terminal 16.

As seen in FIGS. 1–3, the payout dispenser 14 is adapted to securely store for example a large number of units of the payout 12 in a payout dispenser denomination, and to efficiently dispense units of the payout 12 as required in the payout dispenser denomination, such as for example twenty-dollar bills. The payout dispenser 14 may also be adapted to dispense a plurality of different payout dispenser denominations, such as an example one, five, ten, and twenty dollar bills. Further, the system 10 may include a plurality of payout dispensers 14, which may each dispense a different denomination.

Figure 7:
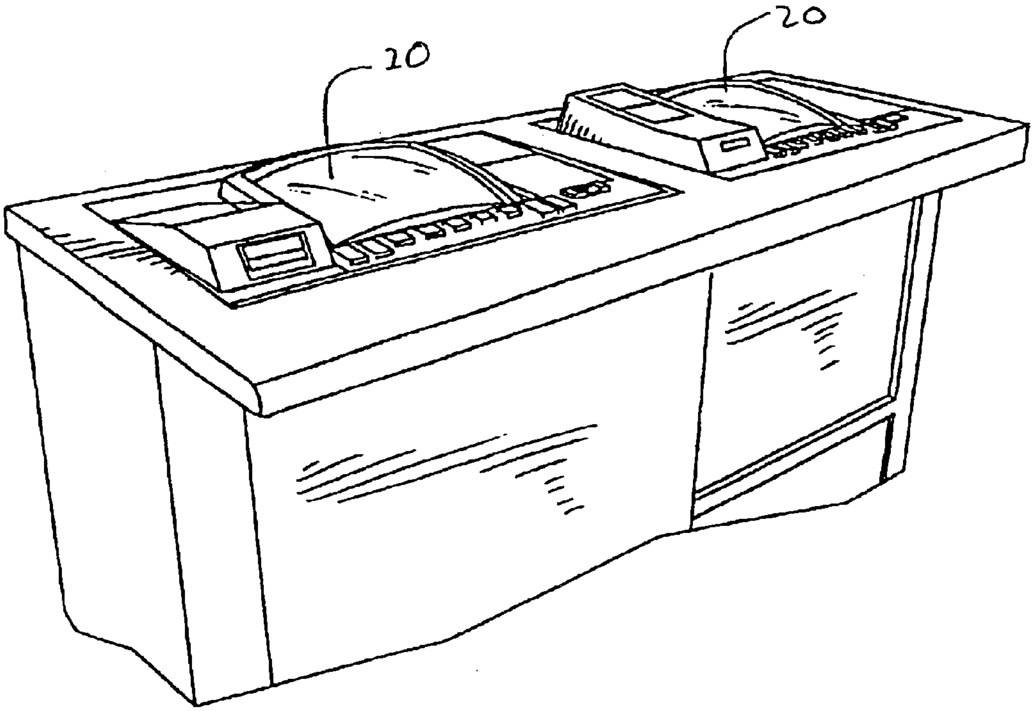
FIG. 7 is a perspective view of payout indicating devices in accordance with an embodiment of the invention.

As illustrated in FIGS. 1 and 7, the system 10 may further include a device 20 for indicating that a payout 12 may be payable responsive to the input of a person to whom the payout 12 may be payable. The payout indicating device 20 may comprise a gaming machine, such as for example a video poker machine or an electronic slot machine, for indicating that a payout 12 is payable for example responsive to a "cashout" or "jackpot" resulting from the play of a game in the gaming machine. The system 10 may include a plurality of payout indicating devices 20 at a location, as for example up to thirty-five payout indicating devices 20 linked together in daisy chain fashion. A payout indicating device network 22 may interconnect the payout indicating devices 20 to each other and to the payout dispenser 14 and the terminal 16. The payout indicating device network 22 may include an interface board 24, which may comprise for example an RS 485 protocol interface for connecting to the payout indicating device 20 to the payout indicating device network 22, and which may include for example a two board set embedded 8051 processor with RAM and program memory, and serial and other parallel input/output ports. The payout indicating device 20 may issue a transaction ticket after a wining game play, redeemable at the terminal 16 for the person to obtain the payout 12, or may lock up and direct the person to the terminal 16 for the payout 12. The payout indicating device network 22 may include connectors 26.

The system 10 may further include a device 28 for enabling the dispensing of a payout breakage, which is the difference between the payout 12 and the units of the payout dispenser denomination in the payout dispenser. For example, the payout breakage for a payout of $42.25, wherein the payout dispenser denomination is twenty dollar bills, would be $2.25, which is the difference between the payout of $42.25, and the units, two in number, of the payout dispenser denomination of twenty dollar bills, totaling $40.00. The payout breakage device 28 may include a payout breakage in a payout breakage denomination smaller than the payout dispenser denomination, such as for example one, five, and ten dollar bills. The payout breakage device 28 may also include a device 30, such as a change machine, for dispensing a payout change denomination smaller than the payout breakage denomination, such as pennies, nickels, dimes, and quarters. The payout breakage device 28 including the payout change device 30 may comprise for example a retail register.

The payout breakage device 28 may be funded and maintained in the system 10 by keeping a running total of the amount of funds therein, as determined by the terminal 16. The terminal 16 compares the payout breakage to a running total it may maintain of the amount in the payout breakage device 28, and if the payout breakage is less than the amount in the payout breakage device 28, then the terminal 16 does not direct the payout dispenser 14 to dispense a unit therein of the payout 12. If the payout breakage is greater than the amount that remains in the payout breakage device 28, then the terminal 16 directs the payout dispenser 14 to dispense a unit of the payout 12 therein sufficient to enable the payout breakage to cover the payout 12. The unit of the payout 12 is placed in the payout breakage device 28 to make change with, and the payout breakage is paid from such change.

Figure 8:
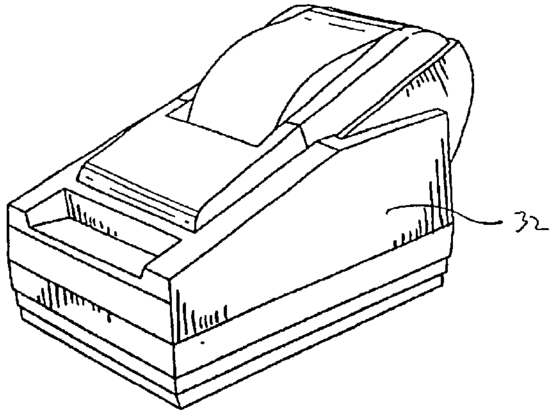
FIG. 8 is a perspective view of a printer, pursuant to an embodiment of the present invention.

Referring to FIGS. 2, 3, and 8, the system 10 may further include a printer 32, adapted to be connected to the terminal 16 for printing system messages and reports from the terminal, wherein the system messages and reports comprise records of system transactions. The printer 32 may comprise a serial or parallel printer, which may be adapted to print out a journal copy such that a carbon record may be maintained of transactions.

As seen in FIGS. 1–4, the payout dispenser 14 may include a housing 34 which houses a payout dispensing mechanism 36, for positively dispensing the payout 12, and an interface board 38, which may comprise for example an embedded processor board, as for example an RS-232 protocol interface for interconnecting and handling the serial communication between the payout dispenser-terminal network 18 and the payout dispenser 14, to which the payout dispensing mechanism 36 is connected. The interface board 38 may include for example a two board set embedded 8051 processor with RAM, program memory, and serial and other parallel input/output ports. The interface board 38 may include a central processing unit and a personality board. The personality board may include the input/output circuitry needed for the various serial ports and parallel serial processing ports, and may further include a driver for a payout lamp.

As illustrated in FIG. 3, the elements of the payout dispenser 14, shown removed from the housing 34, include the payout dispensing mechanism 36, the interface board 38, and may also include a converter 40 for converting for example the serial RS-485 protocol from the payout indicating device network 26 into the RS-232 protocol commands recognized by the payout dispenser 14. The payout dispenser 14 may further include a power supply 42, which provides power to the payout dispensing mechanism 36 and the interface board 38, and a connector 44, for example an RS-232 connector between the terminal 16 and the interface board 38. The payout dispensing mechanism 36 may for example dispense up to ten notes at a time, and may contain up to one-thousand notes, such as for example the JCM HBP10 model.

Figure 9:
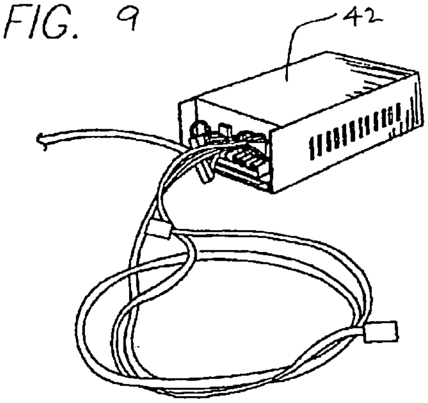
FIG. 9 is a rear perspective view of a power supply pursuant to the practice of an embodiment of the invention.
Figure 10:
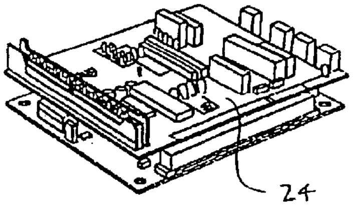
FIG. 10 is a perspective view of an interface board in the practice of an embodiment of the present invention.

As seen in FIGS. 3 and 5, the payout dispenser 14 further includes a plurality of connectors for providing connections thereto, including a power connector 46 from the power supply 42, an exemplary RS-485 connector 48 from a serial controller 50 which includes an embedded processor board, and the exemplary RS-232 connector 44 between the terminal 16 and the interface board 38. Referring to FIG. 9, the power supply 42 may for example be a Skynet SNP 9105-06 power supply, providing twenty-four volts at plus or minus five volts for the components of the payout dispenser 14.

The payout dispensing mechanism 36 may be adapted to further include at least one container 52, such as a cassette, for containing the payout 12 for installation therein, a mechanism 54 for securely storing the payout 12, and a mechanism 56 for positively dispensing the payout 12. The payout dispenser 14 may alternatively include a plurality of the containers 52, adapted to be installed therein, each containing a different payout denomination, such as for example one, five, ten and twenty dollar bills.

As seen in FIGS. 1–3, the terminal 16, which is the attendant interface with the system 10, may include a numeric keyboard for user input, and an alphanumeric display for visual messaging, and which is connected to the terminal 16 and adapted to enable the terminal 16 to print messages thereon. It may comprise a point of sale terminal with a multiple-button keypad and other function buttons, such as for example a Veriphone Omni 480. The terminal 16 may include elements adapted to enable the processing of data, and may comprise a computer.

The payout dispenser-terminal network 18 may include for example data lines, wireless connections, or fiber optic connections. The data lines may for example comprise dedicated lines, T1 lines, or frame relay lines. The payout dispenser-terminal network 18 may further include a plurality of elements 58 adapted to enable connection thereto of the payout dispenser 14, the terminal 16, and the payout indicating device network 22, and to send and receive data therethrough, which elements 58 may comprise a plurality of ports. The ports 58 may port to the payout indicating device network 22 and each of the payout indicating devices 20 connected thereto, the payout dispenser 14, and the terminal 16, which network and devices may each comprise a node ported to by the port 58. Each payout indicating device 20 may constitute a node on the payout indicating device network 22, to be individually addressed, and the terminal 16 may be another addressed node for interfacing the attendant into the system 10 to validate a payout 12 through the interface board 38 in the payout dispenser 14.

The interface board 38 in the payout dispenser 14 may include for example an RS-485 port to which the RS-485 payout indicating device network 22 may be connected to an RS-232 port to which the RS-232 local terminal 16 may be connected. The interface board 38 may further include a port for communicating with the payout dispenser mechanism 36, through the RS-232 to RS-485 converter 40. The payout dispenser 14 for example may include any type of port, may be controlled through any type of serial communication, and may alternatively be controlled through parallel communication where the payout dispenser mechanism 36 may be adapted to communicate with parallel communication.

As further shown in FIG. 1, in a system 10 adapted to include a central station and at least one local station, the system 10 includes a central station 60, for centrally controlling the dispensing of a payout, at least one local station 62, adapted to be connected to the central station 60, and a network 64 for interconnecting the central station 60 and the local station 62. The system 10 may include a plurality of local stations 62.

The central station 60 includes a central terminal 66. The central terminal 66 may include elements adapted to enable the processing of data, and may comprise a computer. The central terminal 66 may comprise a mainframe computer, which may be adapted to store the database required for system operation, including gaming machine records, location records, and cashout transaction records. The central station 60 further includes a central controller 68 for controlling the transmissions to and from the central station 60 and the local station 62. The central controller 68 may be adapted to interface with the central terminal 66 through a local area network, to coordinate and control the serial communication required for system operation. It may be interfaced to the local gaming machine network at the local station 62 for example through a dedicated data line. The dedicated data line may be an analog line such as a private four-wire line, which may pass serial data between the central controller 68 and the local gaming machine network at the local station 62. The central station-local station network 64 may include a central modem 70, for transmitting signals to and receiving signals from the local station 62. The central station 60 further includes a connector 72, adapted to connect the central controller 68 to the central terminal 66, which connector 72 may comprise for example an Ethernet connector.

The local stations 62 each include the elements at the single location as described above, including a local payout dispenser 14, for securely storing and dispensing the payout 12, a local terminal 16, for controlling the dispensing of the payout 12 at the location, adapted to be connected to the local payout dispenser 14 and to interface with an attendant in connection with the payout 12, and a local payout dispenser-terminal network 18, for interconnecting the local payout dispenser 14 and the local terminal 16. The local terminal 16 is adapted to be interfaced to the payout indicating device network 22 through the interface board 38. The local station 62 further includes at least one local payout indicating device 20, and may include a plurality thereof, and a local payout indicating device network 22, for interconnecting each local payout indicating device 20 with the local payout dispenser 14 and the local terminal 16.

The local station 62 may also include a local controller 74, for controlling the transmissions to and from the local station 62 and the central station 62, which local controller 74 includes an embedded processor board. The local controller 74 may be housed in a controller cabinet 76 along with the interface board 28 at the local station 62, and may be adapted to receive data from the central controller 68. It may be adapted to enable the data to be converted to the RS-485 gaming machine network protocol at the local station 62. Further, data may be transmitted from each payout indicating device 20 to the local controller 74 and to the central terminal 66 through the network 64, which may comprise a dedicated data line such as a private four-wire telephone line or a dial up line which may be dialed all the time, a data circuit such as a T1, a frame relay, a fiber optic network, or a wireless system which for example may include encrypted data.

The local payout dispenser-terminal network 18 may include a local modem 78 for transmitting signals to and receiving signals from the central station 60. The local payout dispenser-terminal network 18 may also include a connector 80, for connecting the local controller 74 to the local payout dispenser 14 and the local terminal 16. A proprietary software protocol that communicates the data from the payout indicating device network 22 to the local controller 74 and the central controller 68 is preferably a polled response type network, with defined data pockets and commands. Each payout indicating device 20 may be polled individually. If there is any pending data from that node out on the payout indicating device network 22, then that is sent back to the local controller 74. If it is a command that needs to be forwarded to the central terminal 66, then the local controller 74 may repacketize that data, and transmit it to the central terminal 66 over the network 64. The messages may be prioritized based on the type of message, as for example, a "collect" message may have a higher priority than a routine tracking message. If no other events are pending, an idle message may be sent with device status information. To obtain timely validation of a transaction, each machine on the payout indicating device network 28 should preferably be polled within a short time period such as for example two seconds, such that transaction data is not delayed and transaction validation is not delayed with processing.

The payout indicating device network 22 is connected to the local modem 78 through the local controller 74. The local controller 74 for example may take the RS-485 data from the payout indicating device network 22 and may convert it, for example, over to the RS-232 serial data protocol for the local modem 78. The local modem 78 may then convert the digital RS-232 data from the local controller 74 over to the analog signals to pass, for example, over a telephone line network 64 to the central station 60, where the central modem 70 may convert the analog data back to digital data and may send the digital data through the central controller 68, for example, over an RS-232 connection. The central controller 68 may then accumulate the data from the local station networks, and may translate it, for example, into an Ethernet connection for transmission to the central terminal 66.

In the operation of the system 10 of the invention, a substantial supply of units of the payout 12, sufficient to cover substantial payouts 12 at a particular location, may be stored in a container 52 and installed in the payout dispenser 14.

Each payout indicating device 20 on the payout indicating device network 22 may be assigned a unique address, such as numbers from one through thirty-five, and the local terminal 16 on the payout dispenser-terminal network 18 may also be assigned a unique address, such as the number thirty-six, which may constitute the network nodes. The local controller 74 may continuously communicate with the payout indicating device network 22 and the payout dispenser-terminal network 18, comprising the local networks, and may transmit a poll to each node in sequence and may receive a response from each in turn.

If a payout indicating device 20 or the local terminal 16 have no "event" messages to transmit to the local controller 74, they may transmit "idle" messages containing status data. For example, if the payout indicating devices 20 comprise gaming machines, such status data which may be transmitted in "idle" messages may include "game door state", "game power state", "game memory error state", and/or "game collection state". If an "event" occurs, the payout indicating device 20 or the local terminal 16 may transmit a special message or series of messages to the local controller 74 indicating the type of event that has occurred. For example, for gaming machines, "events" may include "player cashout", "jackpot", "game collection", and/or "player tracking". For the local terminal 16, "events" may include "cashout/jackpot transaction redemption" and/or "game unlock commands". When the local controller receives these "events" messages, it may translate the data and pass it along to the central terminal 66.

When a payout 12 occurs for example on a gaming machine 20, as for a "cashout" and/or a "jackpot," the payout message may be sent to the central terminal 66 through the local controller 74. For payout 12 in a gaming machine 20 which does not issue a ticket but instead locks up, an additional "game lock" message may be sent and echoed back to the local terminal 16 by the local controller 74. The player may receive the payout 12 by notifying the attendant that the gaming machine 20 has locked up in the payout state. Further, the interface board 38 in the payout dispenser 14 may detect the payout event message which passes through the serial ports, and the personality board in the interface board 38 may activate a lamp so that the attendant may know that a payout event has occurred on an identified gaming machine 20, and may expect a player to request the payout 12. When notified of the payout, the attendant may select the appropriate function on the local terminal 16, and may enter the prompted information, including the number of the gaming machine 20 on which the payout 12 occurred. If the payout 12 occurs on a gaming machine 20 which does issue a ticket, the player may present the attendant with the ticket, and the attendant may enter the transaction number printed on the ticket in the local terminal 16.

For both the ticketless and ticketed gaming machines 20, the local terminal 16 may then transmit the payout message to the central terminal 66 through the local controller 74 to validate the transaction. Once validation has occurred and the transaction payment has been authorized by the central terminal 66, a message may be sent to the local terminal 16 to initiate payment of the payout 12 through the payout dispenser 14 and the payout breakage device 28 if necessary and may complete the transaction.

Once payment has been authorized by the central terminal 66, the local terminal 16 may process the data to calculate and determine the manner in which payment is to be made and the amount to be paid out. Since the payment dispenser 14 may, for example, store a finite number of single denomination payout units and the "cashout/jackpot" transaction may be any amount up to the maximum "credit/jackpot" allowed on the gaming machine, not all payments may be made by the payout dispenser 14. The first check may be to see if the number of payment units in the payment dispenser 14 is too low to cover the transaction, whereupon a message may be displayed on the local terminal 16 indicating a "dispenser low" state. When this occurs, the payment dispenser 14 must be refilled, and the payment process stared over again. If it is determined that there are sufficient payment units left to make the payments, calculation may be made of the number of payment units to dispense. If the transaction amount is not equal to a number of units of the payment denomination in the payment dispenser 14, a calculation may also be made of any payments, in payment units, needed to be dispensed by the payout dispenser 14 for funding the payment breakage device 20.

The payout breakage in the payout breakage device 28 is used to make up the difference between the transaction amount and the nearest unit of the payout denomination in the payout dispenser 14. The payout breakage device 28 also may reset to zero when the payout dispenser 14 is filled, and may automatically be maintained by the payout dispenser 14 for example in accordance with the algorithm represented in the flow chart in FIG. 13. If the transaction amount is less than or equal to the amount in the payout breakage device 28, no payout units are dispensed from the payout dispenser 14, and the attachment makes the payment from the payout breakage device 28. If the transaction amount is greater than the amount in the payout breakage device 28, the local terminal 16 may calculate the number of payout units required to be dispensed by the payout dispenser 14. Such calculation may be generated for example by taking the difference between the transaction amount and the payout breakage amount, using integer division to divide the difference by the denomination of the payout in the payout dispenser 14, and adding one, to find the breakage amount so as to insure that the breakage amount is always greater than or equal to zero, and less than the denomination of the payout units in the payout dispenser 14. After receiving payout units from the payout dispenser 14, the attendant may make payout of the transaction amount for example by either combining the dispensed payout units with the appropriate amount from the payout breakage device 28 and/or by making change from the dispensed payout units with the payout breakage. For both types of transactions, the transaction amount may be added to the sum total of all transactions since the last filling of the payout dispenser 14, and may be stored in memory or used in subsequent transaction calculation and decision making.

In an embodiment of the system 10 wherein the payout indicating devices 20 comprise gaming machines, a person may play a machine, win a game jackpot or decide to cash out game credits, and press a collect button or a cash out button on the machine. When the collect or cash out button is pushed, the attendant and the system will validate which button has been pushed. The transaction information may then be sent over the network 64 to the central terminal 66 and stored in the database therein. The attendant may then seek to validate or complete the transaction, and the local terminal 16 may communicate over the network 64 with the central terminal 66 to ensure that the collection or cash out actually occurred. If the transaction is not found in the database of the central terminal 66, then the payment does not get processed. A message is displayed at the local terminal 16 to the attendant that the transaction was not found and that payment cannot be made. In one type of such gaming machine 20, a transaction ticket may be printed at the machine, with a transaction number and the amount that is to be collected printed on the ticket. The ticket may then be given by the player to an attendant who is to attend to the payment of the payout.

In a system 10 which does not include a central terminal, the attendant may enter the ticket number in the terminal 16, which may be adapted to control the dispensing of the payout, and the terminal 16 may verify the transaction ticket and generate dispensing of as much of the payout 12 from the payout dispenser 14 as may be covered by the denomination of the payout 12 in the payout dispenser 14. The balance of the payout may be paid by the attendant from the payout breakage device the payout change device 30.

In another type of gaming machine 20, for example, the machine may lock up and display on a display screen at the terminal 16 the amount of the payout 12 to be paid, and informs the player to contact the attendant to collect the payout 12. The attendant then may enter the number of the machine which the player was playing when the payout 12 became payable and after validation of the terminal 16 the payout is paid through the payout dispenser 14 and/or the payout breakage device and the payout change device 30.

In a system which includes a central terminal 66, the attendant may enter the ticket number in the local terminal 16, which may transmit the ticket number to the central terminal 66. The central terminal 66 may then validate the ticket, and, after validation, the central terminal 66 may then command the local payout dispenser 14 to dispense the appropriate payout. In the other type of gaming machine, the machine may lock up and display on a video screen the amount that is to be paid out, and inform the player to contact the attendant to collect the payout. The attendant may then enter in the local terminal 16 the number of the machine which the player was playing when the payout became payable, the transaction may be verified as above but through the central terminal 66, and after validation the payment may be made through the local payout dispenser 14. In an embodiment of the system 10 which does not include a gaming machine, such as in a retail store, the dispensing of a payout 12 from the payout dispenser 14 is likewise controlled by verification through a local terminal 16 or a central terminal 66.

In any such system 10, for example, the payout dispenser 14 may dispense a payout denomination, and the payout breakage device 28 and the payout change device 30 may comprise a retail register which includes payout denominations smaller than the payout denomination in the payout dispenser 14. The system 10 maintains the payment breakage device 28, for example by keeping a running total in the local terminal 16 of the amount of the funds in the payout breakage device 28 since after a time it may run out of the smaller denominations. The local terminal 16 may make calculations to determine the amount to be dispensed from the payout dispenser 14, and if it is an odd amount, it may determine the amount to be dispensed from the payout breakage device 28, including the change payout device 30, and whether there is enough in the payout breakage device 28, including the payout change device 30, to fund the difference between the amount of the payout and the amount payable from the payout dispenser 14. If there is not enough in the payout breakage device 28 including the payout change device 30 to cover the difference, the payout dispenser 14, responsive to control of the local terminal 16, issues the number of units of the denomination in the payout dispenser 14 to cover the difference for funding the payout breakage device 28 including the payout change device 30 for the payout.

For example, if the game player wins a payout 12 in an odd amount, since the payout dispenser 14 may only dispense a payout 12 in a single denomination, and may only dispense an even number of units of such single denomination, the terminal 16 makes a calculation and determines whether the breakage, which is the amount between the units of the payout dispenser denomination in the payout dispenser 14, can be provided from the payout breakage device 28, or whether a payout unit or units needs to be dispensed from the payout dispenser 14 to fund the payout breakage device 28. For example, if the payout is $42.25 as in the previous example, and the denomination in the payout dispenser 14 is twenty-dollar bills, the payout dispenser 14 would dispense two twenty dollar bills for the payout, and the attendant would pay out the additional $2.25 from the payout breakage device 28. If the payout breakage device 28 did not have the $2.25, the payout dispenser 14 would dispense an additional twenty dollar bill, and the twenty dollar bill could be broken down for example by the attendant or automatically into smaller denominations, for example at on-line or separate change making machines or other retail registers, to make up the breakage amount of $2.25. If the transaction had been for $40.00, and the payout dispenser 14 was dispensing twenty dollar bills, two twenty dollar bills would be dispensed from the payout dispenser 14, and there would be no need to go into the payout breakage device 28.

Figure 12:
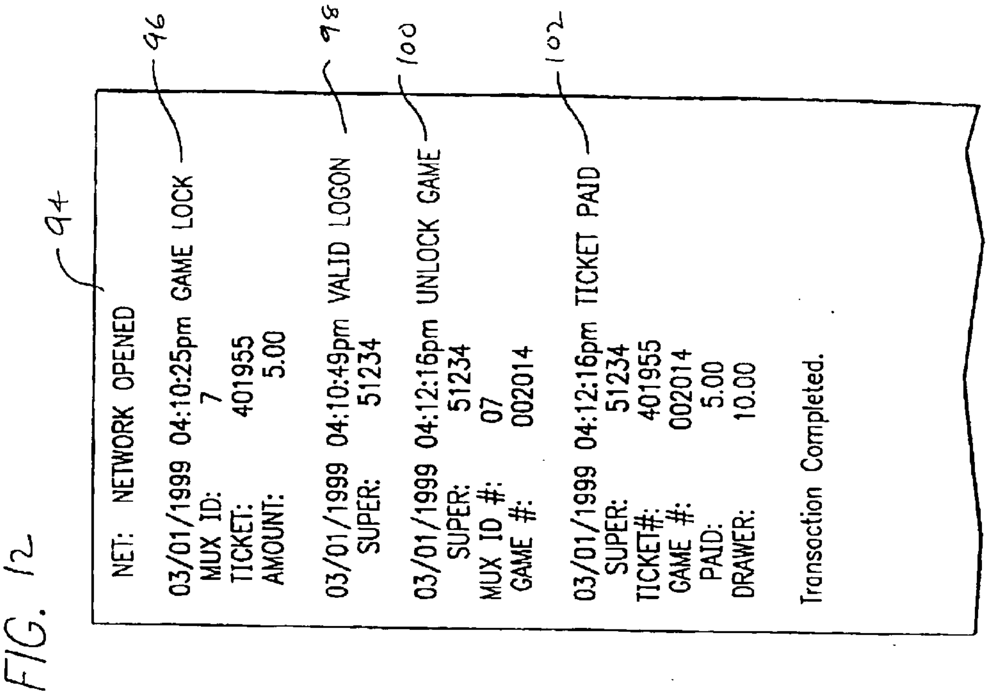
FIG. 12 is a printout of an example of another transaction, in an embodiment of the invention.
Figure 11:
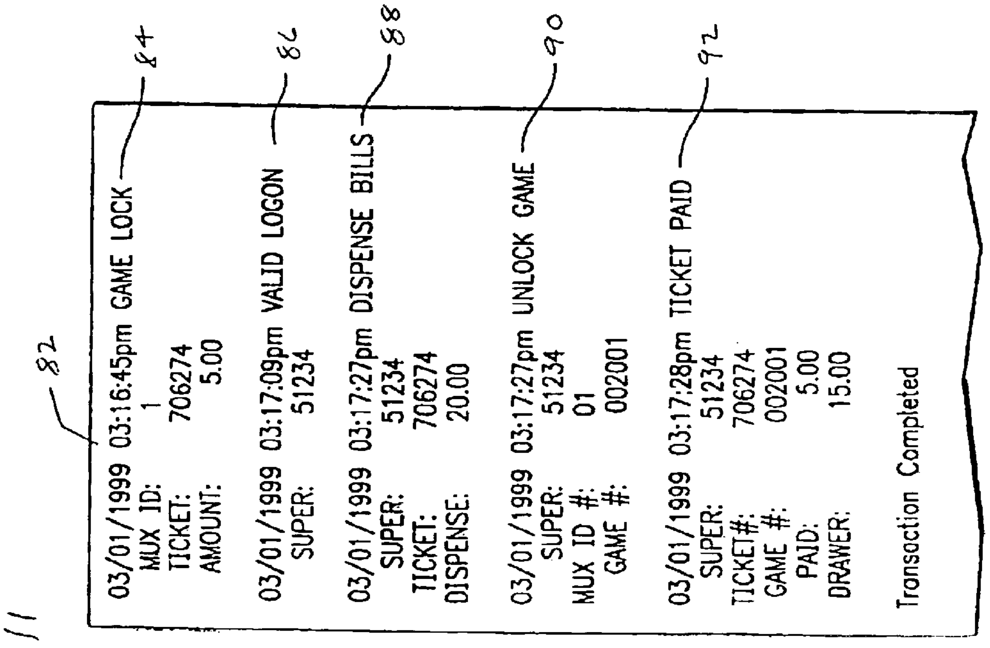
FIG. 11 is a printout of an example of a transaction, pursuant to an embodiment of the invention.

As shown in FIGS. 11–12, at the start of a payout sequence, with a recipient entitled to receive a payout, for example with a machine 20 which is ticketless and is locked up into the payout-owed state, when the machine 20 is locking up, the transaction information is sent by the exemplary RS-485 network to the central terminal 66 at the central station 60. The attendant enters the payout mode in the central terminal 66, with a prompt to enter the number of the machine 20, whereupon the transaction is validated and a signal is sent to the local payout dispenser 14. The local payout dispenser 14 then dispenses a payout.

In FIG. 11, a printout 82 shows the steps in a transaction wherein there was a dispensing of a payout from a local payout dispenser. In this exemplary transaction, there was a payout comprising a $5.00 cash out with dispensing by the payout dispenser 14, and there apparently was insufficient money in the payout breakage device 28 available at the time, whereby the payout dispenser 14 dispensed $20.00, from which change was made and the $5.00 was paid out and the game was locked up. In step 84,"GAME LOCK," the game was locked up, and the machine identification, the ticket number, and the amount of the payout were printed out. In step 86, "VALID LOGON", the transaction was validated, and a signal was sent to the local payout dispenser 14 to dispense a quantity of notes, in this case one note for $20.00. In step 86, "DISPENSE BILLS", since there was in this case insufficient money in the payout breakage device 28 for the payout at that time, which the system has a record of, the local payout dispenser 14 dispensed a $20.00 bill. In step 90, "UNLOCK GAME", the local terminal 16 sends a signal to the game 20 to get it out of locked up payout state. In step 92, "TICKET PAID", the ticket was paid, and the ticket number, the amount paid, and the amount left in the breakage drawer, in this case $15.00, are printed out on the printout 82.

In FIG. 12, a printout 94 shows the steps in a transaction wherein there was no dispensing of a payout 12 from the local payout dispenser 14. In this exemplary transaction, there was a payout comprising a $5.00 cash out, and since there was $15.00 available in the payout breakage device 28 at the time, no dispensing from the payout dispenser 14 was required, and the $5.00 payout was taken from the payout breakage device 28, leaving $10.00 therein. In step 96, "GAME LOCK", the game was locked up, and the machine identification, the ticket number, and the amount of the payout are printed out. In step 98, "VALID LOGON", the transaction was validated. In step 100, "UNLOCK GAME", a signal was sent to the game 20 to unlock it from the payout state. In step 102, "TICKET PAID", the printout 94 shows that the ticket was paid, and shows the ticket number, the game number, the amount paid, and the amount left in the payout breakage device 28, which at that time would be $10.00.

Figure 13:
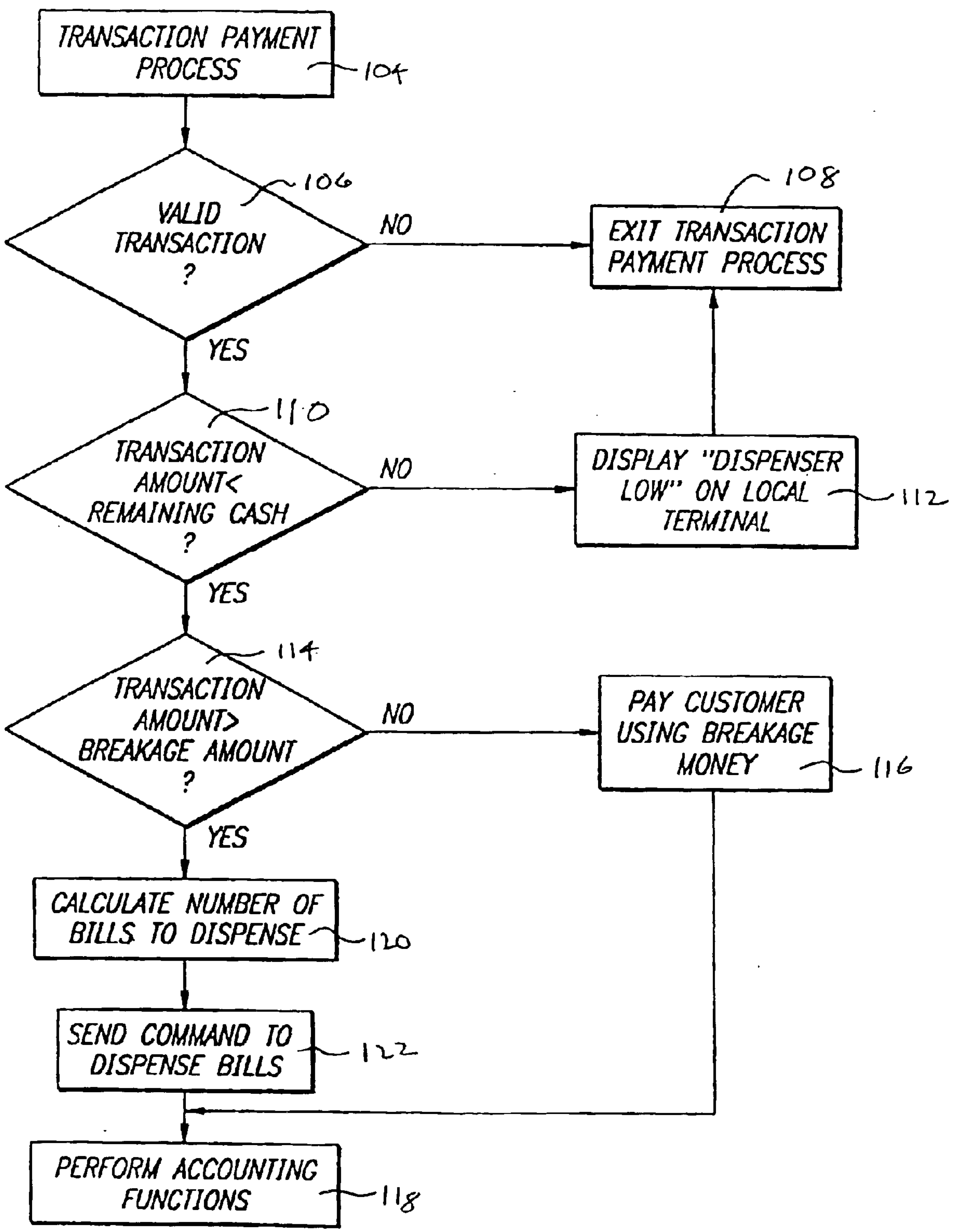
FIG. 13 is a flow chart for an example of a transaction pursuant to an embodiment of the present invention.

Referring to FIG. 13, in the transaction payment process, at step 104, the system 10 will determine if the transaction is valid, at step 106. If the transaction is determined not to be valid, at step 106, the system 10 exits the transaction payment process at step 108. If, on the other hand, the transaction is determined to be valid, at step 106 the system 10 will determine if the transaction amount is less than the remaining payout in the payout dispenser 14, at step 110. If the transaction amount is not less than the remaining payout in the payout dispenser 14, the local terminal 16 will display a "DISPENSER LOW" message, at step 112, and will exit the transaction payment process, at step 108, to await further funding.

At step 114, if the transaction amount is less than the remaining payout in the payout dispenser 14, the system 10 will determine if the transaction amount is greater than the breakage amount in the payout breakage device 28. If the transaction amount is not greater than the breakage amount in the payout breakage device 28, the breakage money in the payout breakage device 28 may be used to pay the customer, at step 116, and the system 10 may perform accounting functions, at step 118. If the transaction amount is greater than the breakage amount in the payout breakage device 28, the system 10 will calculate the number of units of the payout 12 in the payout dispenser 14 to dispense, at step 120, will send a command to dispense the calculated number of payout units, at step 122, and will perform accounting functions, at step 118.

The present invention provides improved systems and methods for enabling the secure storing and controlling of the dispensing of a payout.

In accordance with the present invention the improved systems and methods include a system 10 for enabling the secure storing and controlling of the dispensing of a payout. The system 10 constitutes an automated payment system adapted to connect a plurality of payout indicating devices 20 such as gaming machines in a remote location to a central terminal 66 such as a main frame computer, to enable payments to be made for winnings and/or cash outs posted on the gaming machines. The system 10 includes a payout dispenser 14, which enables a payout attendant on site to efficiently make the appropriate payout from the supply of the payout denomination securely stored in the payout dispenser 14 and automatically dispensed from the payout dispenser 14, under the control of a terminal 16 which verifies transactions in an on-site networked system 10. The on-site local terminal 16 is adapted to be controlled by a central terminal 66 at a central station 60 for verification of transactions in a local-central networked system 10. The system 10 makes payment determinations based on the amount of the transaction, and effectively verifies the transaction amount and decides whether a payout 12 may be dispensed from the payout dispenser 14, and/or whether the payment may be paid out from the payout breakage device 28 which may be funded by the payout dispenser 14.

In the present invention, the system 10 is adapted to be securely and conveniently installed in locations where it may not have been available previously, because of the security risk in the large amounts of payouts that were necessary to be kept on hand, for example at locations such as convenience stores, grocery stores, or taverns where it would not be desirable to have large amounts in non-secure containers.

Pursuant to the invention, in a route type system with spread out locations where dispensers are located remotely from each other, the system 10 enables the convenient and efficient supplying of sufficient payouts for secure storing and automatic verified dispensing thereof.

In the present invention, in locations where the payout indicating devices comprise gaming machines which may include bill acceptors and coin hoppers, the system 10 enables the automatic payout from the secure supply in the payout dispenser 14 while substantially eliminating the need for the inconvenient refilling of the coin hoppers, and enables payouts to be made from a central fund to circumvent the rapidly dissipated supply of coins in coin hoppers in gaming machines.

In accordance with the invention, the payout dispenser 14 comprises a secure safe-like container, rather than a cash drawer which may be readily pried open or easily accessed by a criminal, providing secure storage of the payout supply. The on-site attendant may not be provided with a key to the payout dispenser 14, whereby the attendant may not be able to obtain access to the payout supply therein if a criminal or the attendant desires to obtain such access.

Examples of a preferred form of source code for use in carrying out the above described software and firmware steps in conjunction with the hardware as described above, is included in the microfiche appendix attached to this application and incorporated herein.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A system for securely storing and controlling the dispensing of a payout, comprising:

- a payout dispenser, for securely storing and dispensing a payout;
- a terminal, for controlling the dispensing of the payout, connected to the payout dispenser and to interface with a non-player attendant in connection with the payout; and
- a communication link for interconnecting the payout dispenser and the terminal.

2. The system of claim 1, further comprising a gaming device connected to the payout dispenser and the terminal, and a network for interconnecting the gaming device with the payout dispenser and the terminal.

3. The system of claim 2, further comprising a plurality of gaming devices at a single location.

4. The system of claim 2, wherein the gaming device issues a transaction ticket for the payout.

5. The system of claim 2, wherein the gaming device locks up and directs a person to the terminal for the payout.

6. The system of claim 2, wherein the gaming device includes means for connecting to the network.

7. The system of claim 6, wherein the connection enabling means comprise a node.

8. The system of claim 2, further comprising means for interfacing the payout dispenser to the terminal and to the gaming device network.

9. The system of claim 8, wherein the payout dispenser interfacing means are mounted in the payout dispenser.

10. The system of claim 8, wherein the payout dispenser interfacing means comprise an interface board.

11. The system of claim 2, further comprising means for interfacing the gaming device with the payout dispenser-terminal communication link.

12. The system of claim 11, wherein the gaming device interfacing means comprise an interface board.

13. The system of claim 2, wherein the payout dispenser-terminal communication link further includes means for connecting to the gaming device network, and wherein the communication link sends and receives data therethrough.

14. The system of claim 13, wherein the connecting means comprise a port.

15. The system of claim 14, wherein the port enables sending and receiving data.

16. The system of claim 15, wherein the port comprises a plurality of nodes.

17. The system of claim 16, wherein the plurality of nodes are comprised of the gaming device network, the gaming device, the payout dispenser, and the terminal.

18. The system of claim 1, wherein the payout dispenser stores and dispenses a payout in a payout dispenser denomination, and wherein the system further comprises a payout breakage dispenser that dispenses payout breakage denominations smaller than the payout dispenser denomination.

19. The system of claim 18, further comprising a payout breakage dispenser that dispenses payout breakage denominations smaller than the payout dispenser denomination.

20. The system of claim 1, further comprising a printer for printing a record of a system transaction.

21. The system of claim 1, wherein the terminal includes a data processor.

22. The system of claim 1, further comprising a container that is installable in the payout dispenser.

23. The system of claim 22, wherein the payout dispenser includes a plurality of containers, each container containing one of a plurality of payout denominations.

24. The system of claim 1, wherein the payout dispenser includes a housing for securely storing the payout.

25. The system of claim 1, wherein the payout dispenser includes means for positively dispensing the payout.

26. The system of claim 1, wherein the payout dispenser stores and dispenses a plurality of payout denominations.

27. The system of claim 1, wherein the payout dispenser-terminal communication link includes data lines.

28. The system of claim 27, wherein the data line comprises a dedicated line.

29. The system of claim 27, wherein the data line comprises a TI line.

30. The system of claim 27, wherein the data line comprises a frame relay line.

31. The system of claim 1, wherein the payout dispenser-terminal communication link includes wireless connections.

32. The system of claim 1, wherein the payout dispenser-terminal communication link includes fiber optic connections.

33. The system of claim 1, wherein the payout comprises paper money.

34. The system of claim 1, wherein the payout comprises paper scrip.

35. The system of claim 1, wherein the payout comprises a coupon.

36. The system of claim 1, further comprising a non-gaming device that indicates a purchase, gift, or award.

37. A system for securely storing and controlling the dispensing of a payout, comprising:

- a central station for authorizing the dispensing of a payout, the central station including a central terminal;
- a local station connected to the central station, the local station including:
  - a payout dispenser for securely storing and dispensing the payout; and
  - a local terminal for controlling the dispensing of the payout, wherein the local terminal connects to the payout dispenser and interfaces with a non-player attendant in connection with the payout; and
- a communication link that interconnects the central station and the local station, wherein the communication link interconnects the payout dispenser, the local terminal, and the central terminal.

38. The system of claim 37, wherein the local station further comprises a gaming device connected to the payout dispenser and the local terminal, and a network for interconnecting the gaming device with the payout dispenser and the terminal.

39. The system of claim 38, further comprising a plurality of gaming devices at a single location.

40. The system of claim 38, further comprising a plurality of gaming devices at the location of each of the plurality of local stations.

41. The system of claim 38, wherein the gaming device issue a transaction ticket for the payout.

42. The system of claim 38, wherein the gaming device locks up and directs a person to the local terminal for the payout.

43. The system of claim 38, wherein the gaming device includes means for connecting to the gaming device network.

44. The system of claim 43, wherein the connecting means comprise a node.

45. The system of claim 38, further comprising means for interfacing the payout dispenser to the terminal and to the gaming device network.

46. The system of claim 45, wherein the payout dispenser interfacing means are mountable in the payout dispenser.

47. The system of claim 38, further comprising means for interfacing the gaming device with the communication link.

48. The system of claim 47, wherein the payout dispenser interfacing means comprise an interface board.

49. The system of claim 38 wherein the communication link further includes means for connecting to the gaming device network, and wherein the communication link sends and receives data therethrough.

50. The system of claim 49, wherein the gaming device network connecting means comprise an interface board.

51. The system of claim 49, wherein the connecting means comprise a port.

52. The system of claim 51, further comprising means for enabling the port to send and receive data.

53. The system of claim 52, wherein the port enabling means comprise a plurality of nodes.

54. The system of claim 53, wherein the plurality of nodes include the gaming device network, the gaming device, the payout dispenser, and the terminal.

55. The system of claim 37, wherein the payout dispenser stores and dispenses a payout in a payout dispenser denomination, and the local station further comprises a payout breakage dispenser that dispenses payout breakage denominations smaller than the payout dispenser denomination.

56. The system of claim 55, wherein the local station further comprises a payout breakage dispenser that dispenses payout breakage denominations smaller than the payout dispenser denomination.

57. The system of claim 37, wherein the local station further comprises a printer for printing a record of a system transaction.

58. The system of claim 37, wherein the central station further comprises a central controller that controls transmissions between the central station and the local station.

59. The system of claim 58, wherein the communication link includes means for connecting the central controller to the central terminal, the connecting means comprising an ethernet connection.

60. The system of claim 37, wherein the central terminal includes a data processor.

61. The system of claim 37, wherein the local station further includes a local controller that controls transmissions between the local station and the central station.

62. The system of claim 61, wherein the communication link further includes means for connecting the local controller to the payout dispenser and the local terminal.

63. The system of claim 37, further comprising a plurality of local stations.

64. The system of claim 37, further comprising a container that is installable in the payout dispenser.

65. The system of claim 64, wherein the payout dispenser includes a plurality of the containers, each container containing one of a plurality of payout denominations.

66. The system of claim 37, wherein the payout dispenser includes a housing for securely storing the payout.

67. The system of claim 37, wherein the payout dispenser includes means for positively dispensing the payout.

68. The system of claim 37, wherein the payout dispenser stores and dispenses a plurality of payout denominations.

69. The system of claim 37, wherein the local terminal includes a data processor.

70. The system of claim 37, further comprising a central modem for transmitting signals to and receiving signals from the local station.

71. The system of claim 37, further comprising a local modem for transmitting signals to and receiving signals from the central station.

72. The system of claim 37, wherein the communication link includes a data line.

73. The system of claim 72, wherein the data line comprises a dedicated line.

74. The system of claim 72, wherein the data line comprises a TI line.

75. The system of claim 72, wherein the data line comprises a frame relay line.

76. The system of claim 37, wherein the communication link includes wireless connections.

77. The system of claim 37, wherein the communication link includes fiber optic connections.

78. The system of claim 37, wherein the payout comprises paper money.

79. The system of claim 37, wherein the payout comprises paper scrip.

80. The system of claim 37, wherein the payout comprises a coupon.

81. The system of claim 37, further comprising a non-gaming device that indicates a purchase, gift, or award.

82. A method of securely storing and controlling the dispensing of a payout in a system which comprises a payout dispenser, a terminal, and a communication link, the method comprising:

interconnecting the payout dispenser and the terminal with the communication link;

securely storing a payout in the payout dispenser; and authorizing the dispensing of the payout from the terminal, wherein the terminal is operatively associated with the payout dispenser via the communication link, and wherein a non-player attendant interfaces with the terminal in connection with the payout.

83. The method of claim 82, further comprising:

controlling the dispensing of the payout from the terminal; and dispensing the payout from the payout dispenser.

84. The method of claim 82, further comprising a gaming device connected to the payout dispenser and the terminal, and a network for interconnecting the gaming device with the payout dispenser and the terminal.

85. The method of claim 82, further comprising:

enabling the dispensing of a payout breakage in a payout breakage denomination smaller than the payout dispenser denomination;

storing a payout of a particular denomination in the payout dispenser;

storing a denomination smaller than the particular denomination in the payout breakage device;

dispensing the payout of a particular denomination from the payout dispenser, and dispensing the denomination smaller than the particular denomination from the payout breakage device.

86. The method of claim 82, further comprising printing a record of a system transaction with a printer.

87. The method of claim 82, wherein the terminal includes a data processor, and wherein the method further comprises controlling the dispensing of the payout using the data processor.

88. The method of claim 82, further comprising a container that is installable in the payout dispenser, and wherein the method further comprises:

containing the payout in the container, and storing the container in the payout dispenser.

89. The method of claim 82, wherein the payout dispenser includes a housing for securely storing the payout, and wherein the method further comprises storing the payout in the payout dispenser housing.

90. The method of claim 82, further comprising positively dispensing the payout.

91. The method of claim 82, wherein the payout dispenser stores and dispenses a plurality of payout denominations.

92. A method of securely storing and controlling the dispensing of a payout in a system which comprises a central station, a local station, and a communication link, the method comprising:

interconnecting the central station and the local station, wherein the central station includes a central terminal, wherein the local station includes a payout dispenser and a local terminal, and wherein the communication link interconnects the payout dispenser, the local terminal, and the central terminal;

securely storing and dispensing the payout using the local station that receives local payout authorization and the central station that receives central payout authorization;

centrally authorizing the dispensing of a payout using the central terminal that provides central payout authorization; and locally authorizing the dispensing of the payout using the local terminal, wherein the local terminal is operatively linked to the payout dispenser, and wherein a non-player attendant interfaces with the local terminal, the non-player attendant providing local payout authorization in connection with the payout.

93. The method of claim 92, further comprising:

controlling the dispensing of the payout from the terminal at the local station, and dispensing the payout from the terminal at the local station.

94. The method of claim 92, wherein the local station further comprises a gaming device, and a network for interconnecting the gaming device with the payout dispenser and the terminal, and wherein the method further comprises generating input of a payout recipient from the gaming device at the local station.

95. The method of claim 92, wherein the payout dispenser stores and dispenses a payout in a payout dispenser denomination, and the local station further comprises a payout breakage dispenser that dispenses payout breakage denominations smaller than the payout dispenser denomination, and wherein the method further comprises:

storing a payout of a particular denomination in the payout dispenser at the local station;

storing a denomination smaller than the particular denomination in the payout breakage device at the local station;

dispensing the payout of a particular denomination from the payout dispenser at the local station; and dispensing the denomination smaller than the particular denomination from the payout breakage device at the local station.

96. The method of claim 92, further comprising printing a record of a system transaction in the printer.

97. The method of claim 92, further comprising controlling the transmissions to and from the central terminal and the local station from a central station controller in the central station.

98. The method of claim 92, wherein the central terminal includes means for processing data, and wherein the method further comprises controlling the dispensing of the payout from the central station data processing means.

99. The method of claim 92, further comprising controlling transmissions to and from the local terminal and the central station from a local station controller in the local station.

100. The method of claim 92, further comprising a plurality of local stations, and wherein the method further comprises dispensing payouts at the plurality of local stations.

101. The method of claim 92, further comprising a container that is installable in the payout dispenser, and wherein the method further comprises:

containing the payout in the container; and storing the container in the payout dispenser.

102. The method of claim 92, wherein the payout dispenser includes a housing for securely storing the payout, and wherein the method further comprises storing the payout in the payout dispenser housing at the local station.

103. The method of claim 92, further comprising positively dispensing the payout at the local station.

104. The method of claim 92, wherein the payout dispenser stores and dispenses a plurality of payout denominations, and wherein the method further comprises:

storing a plurality of payout denominations at the local station; and dispensing a plurality of denominations at the local station.

105. The method of claim 92, wherein the local terminal includes means for processing data, and wherein the method further comprises controlling the dispensing of the payout from the local station data processing means.

* * * * *

UNITED STATES PATENT AND TRADEMARK OFFICE

CERTIFICATE OF CORRECTION

PATENT NO. : 6,896,180 B2
DATED : May 24, 2005
INVENTOR(S) : Miodunski et al.

It is certified that error appears in the above-identified patent and that said Letters Patent is hereby corrected as shown below:

Column 4,
Line 31, replace “scrip” with -- script --.

Column 5,
Line 13, replace “wining” with -- winning --.

Column 10,
Line 4, replace “stared” with -- started --.

Column 11,
Line 9, after “device” insert -- 28 including --.

Column 15,
Line 63, replace “scrip” with -- script --.

Signed and Sealed this

Twenty-third Day of August, 2005

JON W. DUDAS
*Director of the United States Patent and Trademark Office*

UNITED STATES PATENT AND TRADEMARK OFFICE

CERTIFICATE OF CORRECTION

PATENT NO. : 6,896,180 B2
DATED : May 24, 2005
INVENTOR(S) : Miodunski et al.

It is certified that error appears in the above-identified patent and that said Letters Patent is hereby corrected as shown below:

Column 17,
Line 56, replace "scrip" with -- script --.

Signed and Sealed this

Twentieth Day of September, 2005

JON W. DUDAS
*Director of the United States Patent and Trademark Office*